(12) United States Patent
Le et al.

(10) Patent No.: US 11,776,565 B2
(45) Date of Patent: Oct. 3, 2023

(54) TAPE HEAD WITH SIDE-SHIELDED WRITERS AND PROCESS FOR MAKING SAME

(71) Applicant: Western Digital Technologies, Inc., San Jose, CA (US)

(72) Inventors: Quang Le, San Jose, CA (US); Hongquan Jiang, San Jose, CA (US); Cherngye Hwang, San Jose, CA (US); David J. Seagle, Morgan Hill, CA (US); Xiaoyong Liu, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/647,809

(22) Filed: Jan. 12, 2022

(65) Prior Publication Data
US 2023/0223043 A1 Jul. 13, 2023

(51) Int. Cl.
*G11B 5/11* (2006.01)
*G11B 5/31* (2006.01)

(52) U.S. Cl.
CPC .............. *G11B 5/11* (2013.01); *G11B 5/3133* (2013.01)

(58) Field of Classification Search
None
See application file for complete search history.

(56) References Cited

U.S. PATENT DOCUMENTS

| | | | |
|---|---|---|---|
| 5,566,032 A | 10/1996 | Cleveland et al. | |
| 6,760,199 B2 | 7/2004 | Biskeborn | |
| 6,778,359 B1 * | 8/2004 | Iwama | G11B 5/584 |
| 8,009,386 B2 | 8/2011 | Hachisuka | |
| 8,416,525 B2 * | 4/2013 | Schwarz | G11B 5/584 |
| | | | 360/77.12 |
| 9,111,550 B1 * | 8/2015 | Liu | G11B 5/11 |
| 9,355,656 B1 | 5/2016 | Biskeborn et al. | |
| 9,361,912 B1 * | 6/2016 | Liu | G11B 5/3163 |
| 9,406,317 B1 * | 8/2016 | Tang | G11B 5/315 |
| 9,443,541 B1 * | 9/2016 | Liu | G11B 5/315 |
| 9,489,969 B1 * | 11/2016 | Ikegawa | G11B 5/23 |
| 9,508,364 B1 * | 11/2016 | Tang | G11B 5/313 |
| 9,653,101 B1 * | 5/2017 | Liu | G11B 5/235 |

(Continued)

FOREIGN PATENT DOCUMENTS

| | | | |
|---|---|---|---|
| CN | 1584988 A | 2/2005 | |
| JP | 2008262681 A | * 10/2008 | ............... G11B 5/11 |

*Primary Examiner* — William J Klimowicz
(74) *Attorney, Agent, or Firm* — PATTERSON + SHERIDAN, LLP; Steven H. VerSteeg

(57) ABSTRACT

The present disclosure generally relates to a tape head of a tape drive, and methods of forming thereof. In one embodiment, a tape head for magnetic storage devices comprises a trailing shield, a leading shield, a first write pole coupled to the trailing shield, a second write pole coupled to the leading shield, and side shields spaced from the first write pole and the second write pole by a thin insulation layer. The side shields are further disposed between the trailing shield and the leading shield. In another embodiment, a tape head for magnetic storage devices comprises a main pole disposed between a trailing shield and a leading shield and a side shield disposed adjacent to the main pole. The side shield is further disposed between the trailing shield and the leading shield and spaced from the main pole by a thin insulation layer.

18 Claims, 13 Drawing Sheets

(56) References Cited

U.S. PATENT DOCUMENTS

| | | | | |
|---|---|---|---|---|
| 9,697,855 B1* | 7/2017 | Liu | ................. | G11B 5/315 |
| 10,109,304 B1* | 10/2018 | Liu | ................. | G11B 5/232 |
| 10,468,054 B1* | 11/2019 | Shin | ................. | G11B 5/3116 |
| 11,152,021 B1* | 10/2021 | Liu | ................. | G11B 5/607 |
| 11,514,932 B1* | 11/2022 | Le | ................. | G11B 5/3912 |
| 2002/0186505 A1* | 12/2002 | Biskeborn | ............ | G11B 5/3967 |
| | | | | 360/129 |
| 2005/0024766 A1* | 2/2005 | Khera | ................. | G11B 5/1278 |
| 2009/0147410 A1* | 6/2009 | Jiang | ................. | G11B 5/1278 |
| | | | | 360/319 |
| 2009/0237833 A1* | 9/2009 | Sato | ................. | G11B 15/26 |
| | | | | 360/77.12 |
| 2012/0262824 A1 | 10/2012 | Jubert et al. | | |
| 2016/0307586 A1* | 10/2016 | Liu | ................. | G11B 5/1278 |
| 2017/0148473 A1* | 5/2017 | Wei | ................. | G11B 5/3116 |
| 2018/0268846 A1 | 9/2018 | Biskeborn et al. | | |
| 2019/0348068 A1* | 11/2019 | Zhang | ................. | G11B 5/3163 |

* cited by examiner

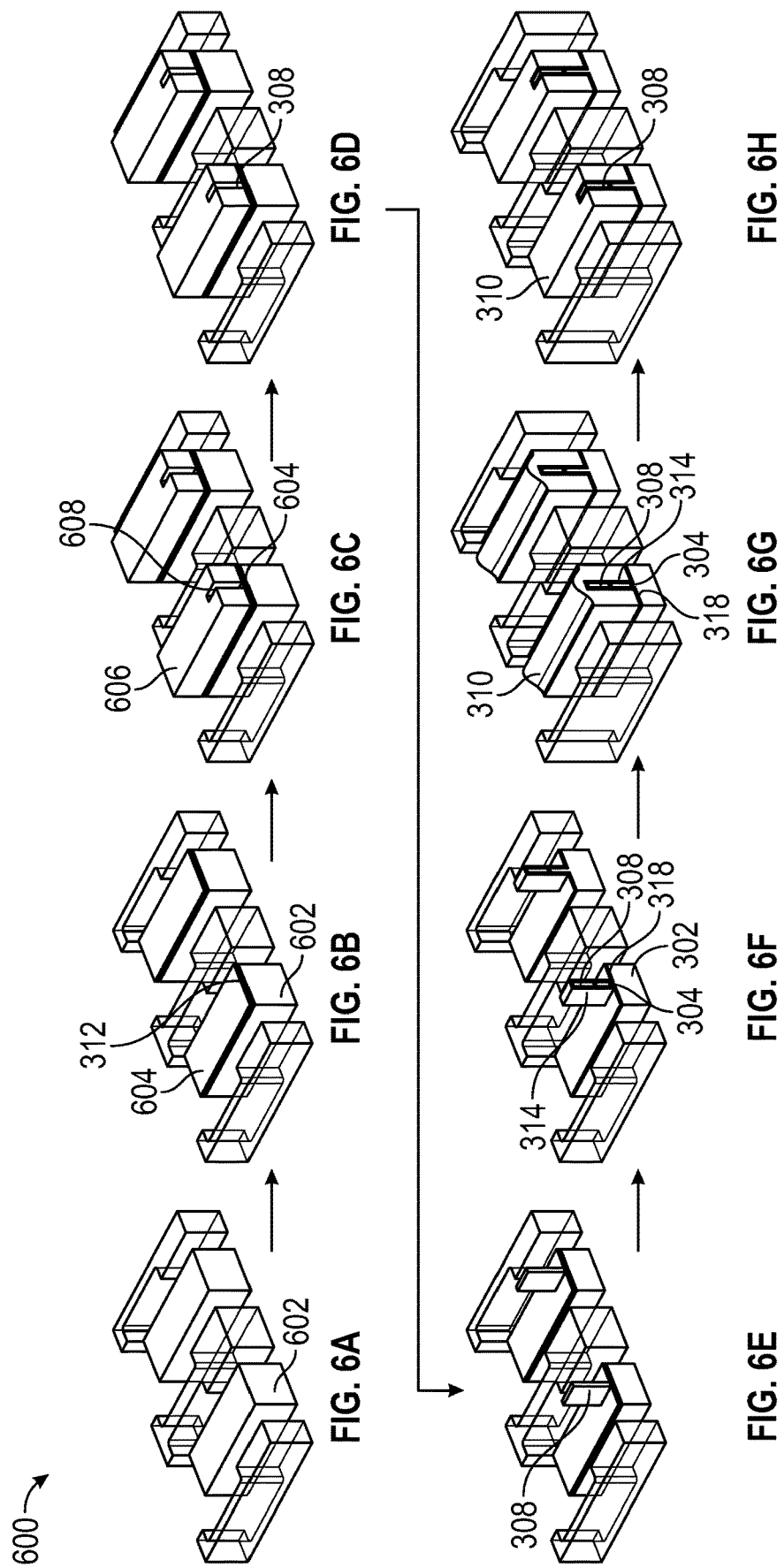

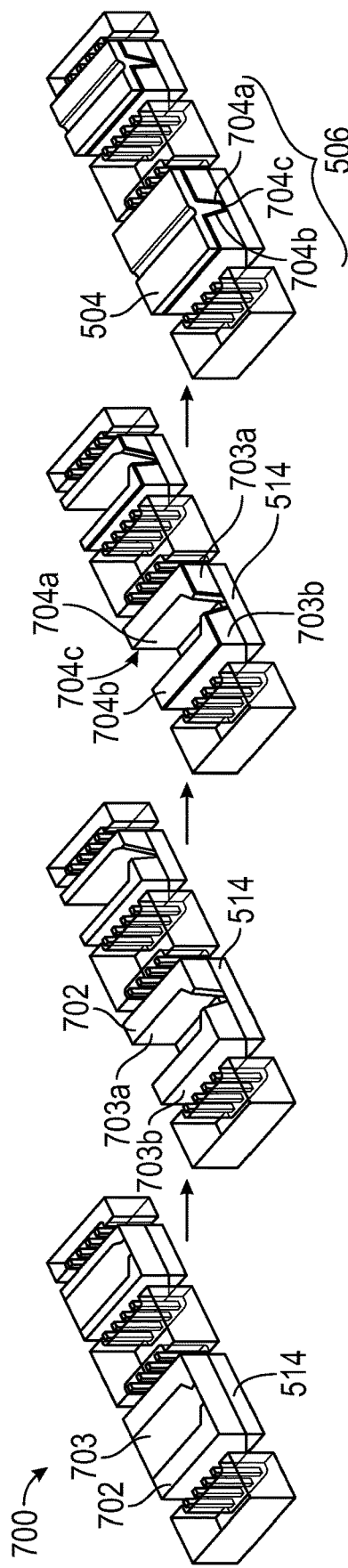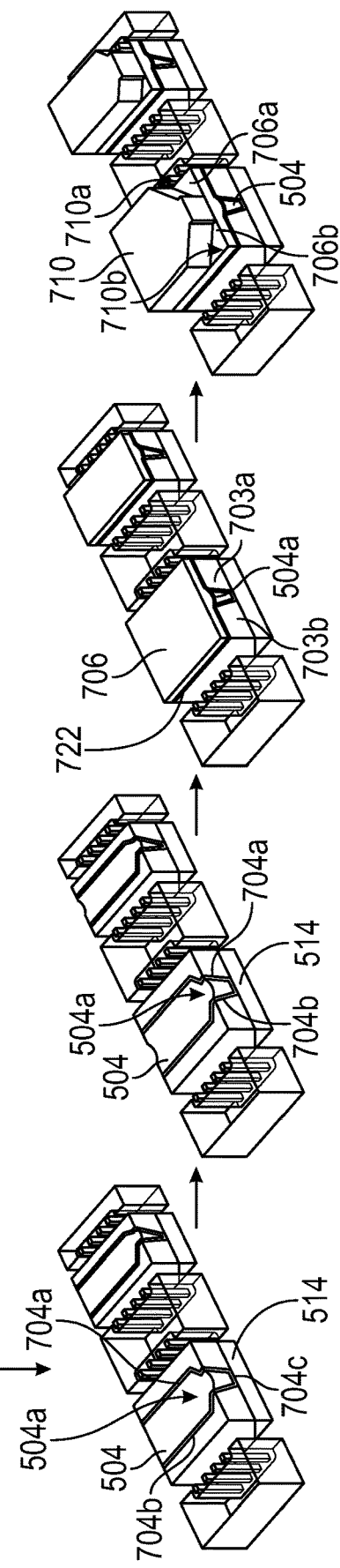

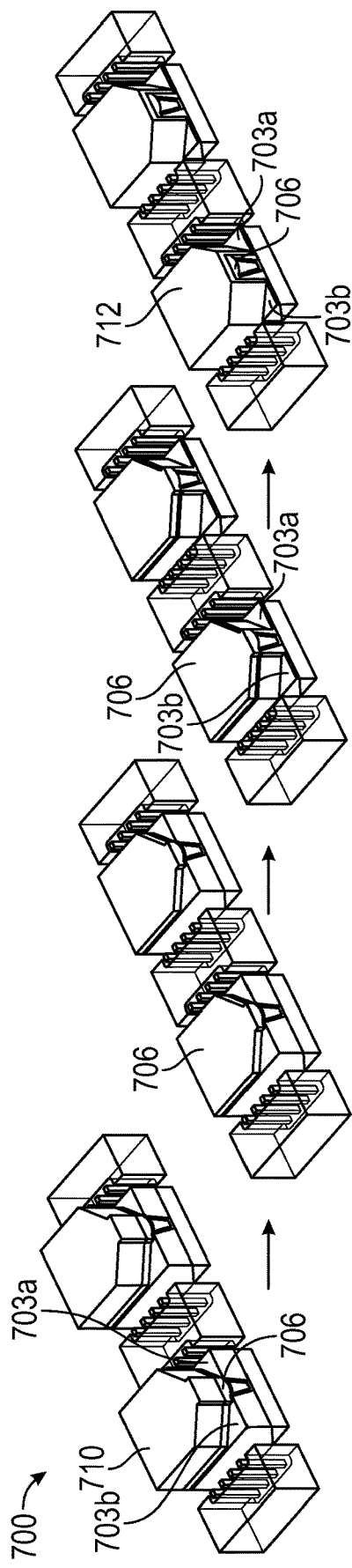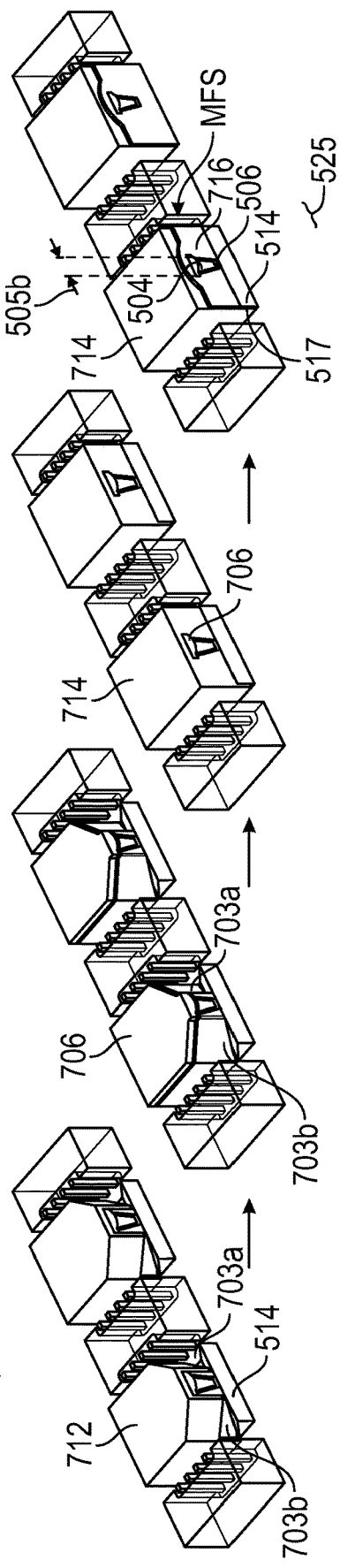

TAPE HEAD WITH SIDE-SHIELDED WRITERS AND PROCESS FOR MAKING SAME

BACKGROUND OF THE DISCLOSURE

Field of the Disclosure

Embodiments of the present disclosure generally relate to a tape head apparatus, and methods of forming tape head apparatus, for magnetic storage devices, such as magnetic tape drives.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array. However, where multiple writers operate at the same time, such as in a tape head array, problems, such as crosstalk, bit flipping, etc., tend to emerge more frequently.

Crosstalk is a phenomenon that occurs when two adjacent tape heads perform writing operations at about the same time. Particularly, crosstalk is present where the written portion for a tape head is affected by the magnetic flux created by an adjacent tape head, thereby degrading or otherwise adversely affecting the written information from the first tape head. The tape heads do not need to be active simultaneously; crosstalk may emerge even upon performing writing operations within a few nanoseconds of each other, depending on the write gap of the particular tape head being used.

Therefore, there is a need in the art for an improved tape head that reduces crosstalk between tape heads without having to increase the spacing between tape heads.

SUMMARY OF THE DISCLOSURE

The present disclosure generally relates to a tape head of a tape drive, and methods of forming thereof. In one embodiment, a tape head for magnetic storage devices comprises a trailing shield, a leading shield, a first write pole coupled to the trailing shield, a second write pole coupled to the leading shield, and side shields spaced from the first write pole and the second write pole by a thin insulation layer. The side shields are further disposed between the trailing shield and the leading shield. In another embodiment, a tape head for magnetic storage devices comprises a main pole disposed between a trailing shield and a leading shield and a side shield disposed adjacent to the main pole. The side shield is further disposed between the trailing shield and the leading shield and spaced from the main pole by a thin insulation layer.

In one embodiment, a tape head comprises a trailing shield disposed at a media facing surface (MFS), a first write pole coupled to the trailing shield, a leading shield disposed at the MFS adjacent to the first write pole, a second write pole coupled to the leading shield, wherein the second write pole is disposed adjacent to the first write pole, a side shield disposed adjacent to the first write pole and the second write pole, wherein the side shield is a soft bias side shield, wherein the side shield is further disposed between the trailing shield and the leading shield, a first insulation layer disposed between the first write pole and the second write pole, a second insulation layer disposed between and in contact with the side shield and the first and second write poles; and a third insulation layer disposed between the side shield and the leading shield.

In another embodiment, a tape head comprises a plurality of read heads configured to read data to a tape, and a plurality of write heads configured to write data to the tape, wherein each of the plurality of write heads comprise: a main pole disposed at a media facing surface (MFS), a trailing shield disposed adjacent to a first surface of the main pole at the MFS, a leading shield disposed adjacent to a second surface of the main pole at the MFS, a first side shield disposed adjacent to a third surface of the main pole, the first side shield being spaced a distance of about 2 nm to about 50 nm from the third surface of the main pole, and a second side shield disposed adjacent to a fourth surface of the main pole, the second side shield being spaced a distance of about 2 nm to about 50 nm from the fourth surface of the main pole, wherein the first side shield and the second side shield are further disposed in contact with the leading shield.

In yet another embodiment, a tape head comprises a plurality of read heads configured to read data to a tape, and a plurality of write heads configured to write data to the tape, wherein each of the plurality of write head comprises a main pole disposed at a media facing surface (MFS), wherein a first surface of the main pole is concaved, a leading shield disposed adjacent to a second surface of the main pole, wherein the leading shield has a first depth, a first side shield disposed adjacent to a third surface of the main pole, the first side shield being further disposed above and in contact with the leading shield at the MFS, wherein the first side shield has a second depth less than the first depth of the leading shield, a second side shield disposed adjacent to a fourth surface of the main pole, the second side shield being further disposed above and in contact with the leading shield at the MFS, wherein the second side shield has a third depth less than the first depth of the leading shield; and a coil.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

FIGS. 6A-6H illustrate a process flow of a method of forming a tape head, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head of a tape drive, and methods of forming thereof. In one embodiment, a tape head for magnetic storage devices comprises a trailing shield, a leading shield, a first write pole coupled to the trailing shield, a second write pole coupled to the leading shield, and side shields spaced from the first write pole and the second write pole by a thin insulation layer. The side shields are further disposed between the trailing shield and the leading shield. In another embodiment, a tape head for magnetic storage devices comprises a main pole disposed between a trailing shield and a leading shield and a side shield disposed adjacent to the main pole. The side shield is further disposed between the trailing shield and the leading shield and spaced from the main pole by a thin insulation layer.

Figure 1A:
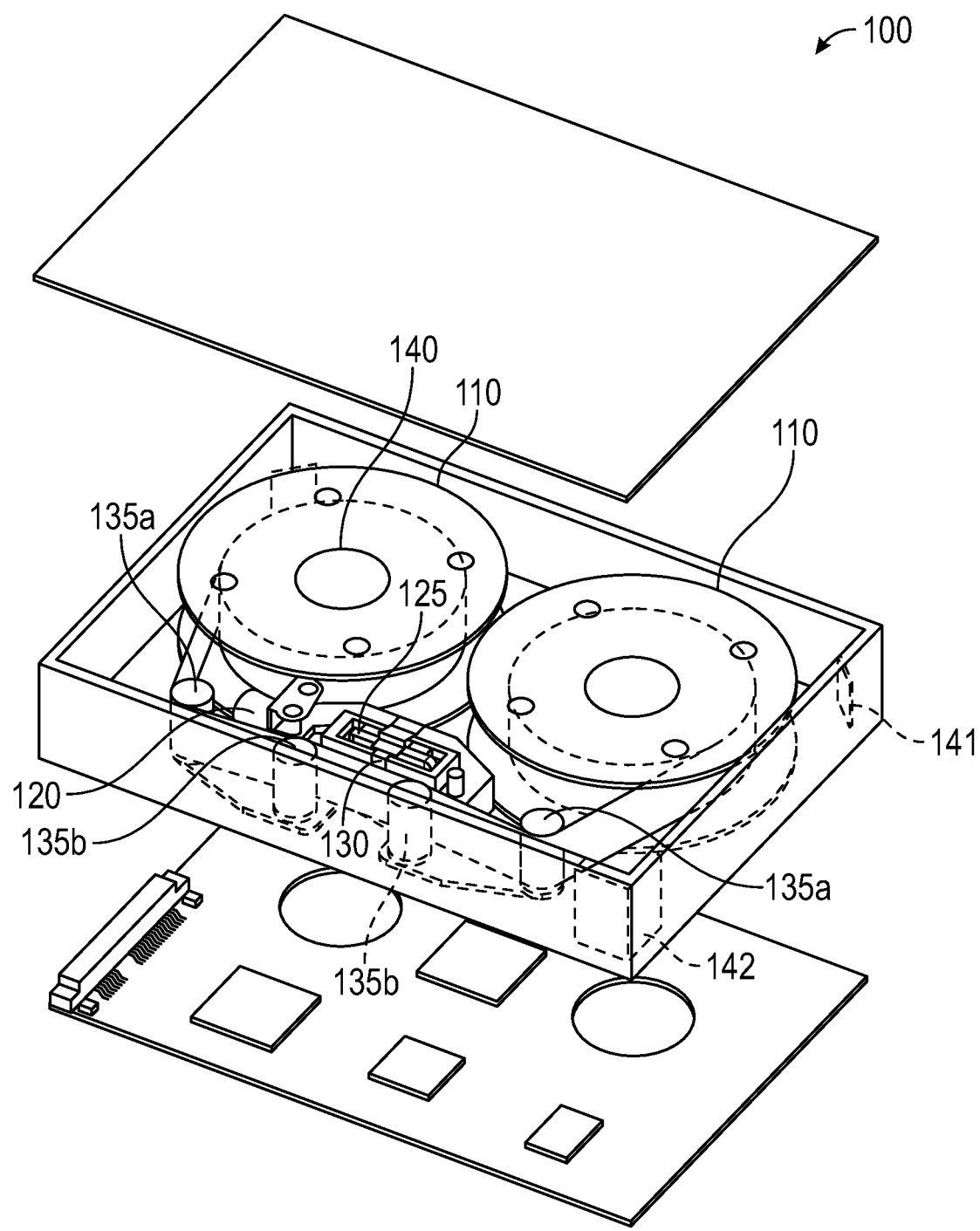
FIGS. 1A-1C illustrate a perspective exploded view, a simplified top down view, and a side profile view of a tape drive, in accordance with some embodiments.
Figure 1B:
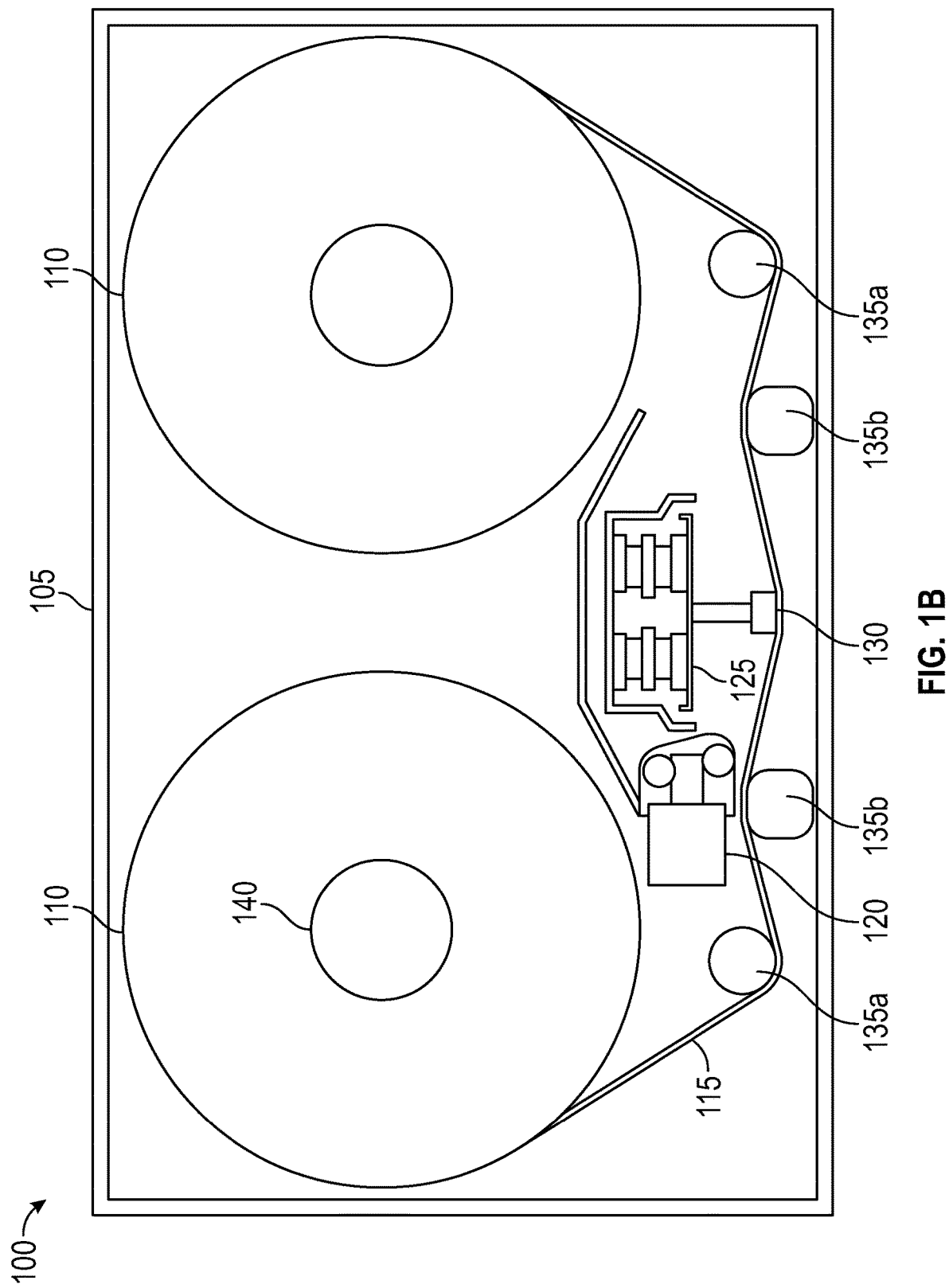
Figure 1C:
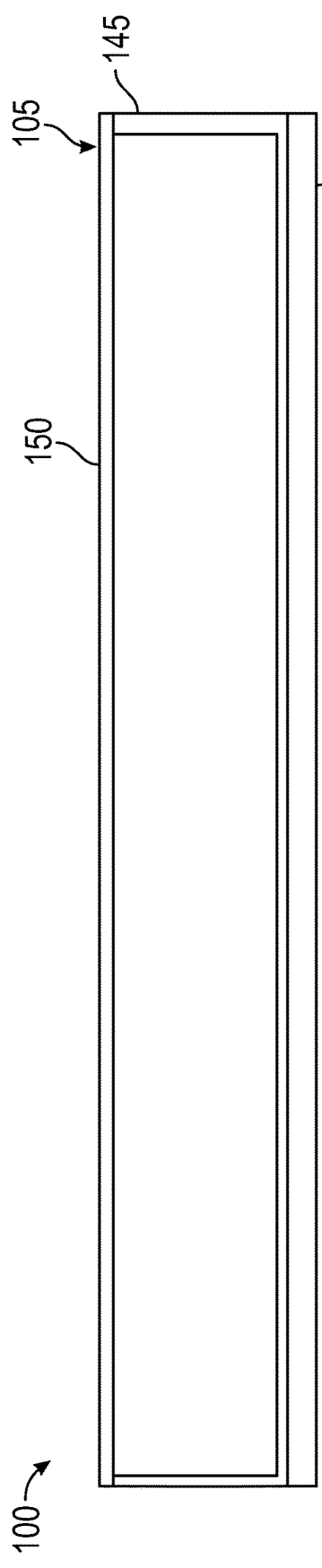

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A.

In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the tape reel 110. One or more of the tape reels 110 may form a part of a removable cartridge and are not necessarily part of the tape drive 100. In such embodiments, the tape drive 100 may not be a tape embedded drive as it does not have embedded media, the tape drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or the tape media 115 is contained in a cartridge that is removable from the tape drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the tape reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The VCM 125 and stepping motor 120 may variably position the tape head(s) transversely with respect to the width of the recording tape. The stepping motor 120 may provide coarse movement, while the VCM 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the tape drive 100 may be hermetically sealed for environmental control by attaching (e.g., laser welding, adhesive, etc.) the cover 150 to the base 145. The tape drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the particle filters 141 and/or the desiccant 142 may be left out.

In various embodiments, the tape drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
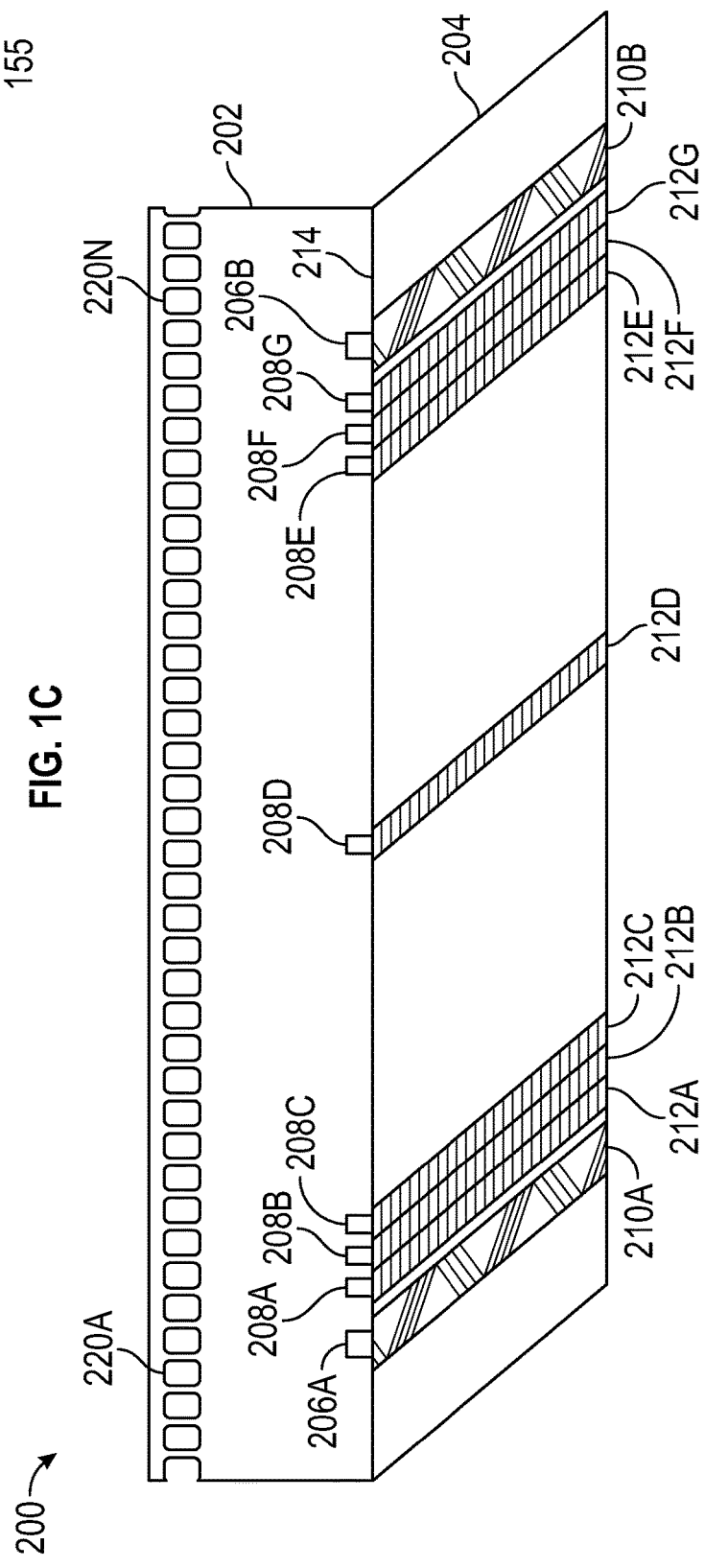
FIG. 2 is a schematic illustration of a tape head and tape that are aligned.

FIG. 2 is a schematic illustration of a tape head 200 and a tape 204 that are aligned. The tape head 200 comprises a tape head body 202 that is aligned with the tape 204. The tape 204 moves past the tape head 200 during read and/or write operations. The tape head module assembly 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the tape head body 202. The plurality of pads 220A-220N coupled to the tape head body 202 is not limited to the number shown in FIG. 2. Rather, more or less pads are contemplated. The pads 220A-220N are used to connect the drive electronics to the first servo head 206A and the second servo head 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
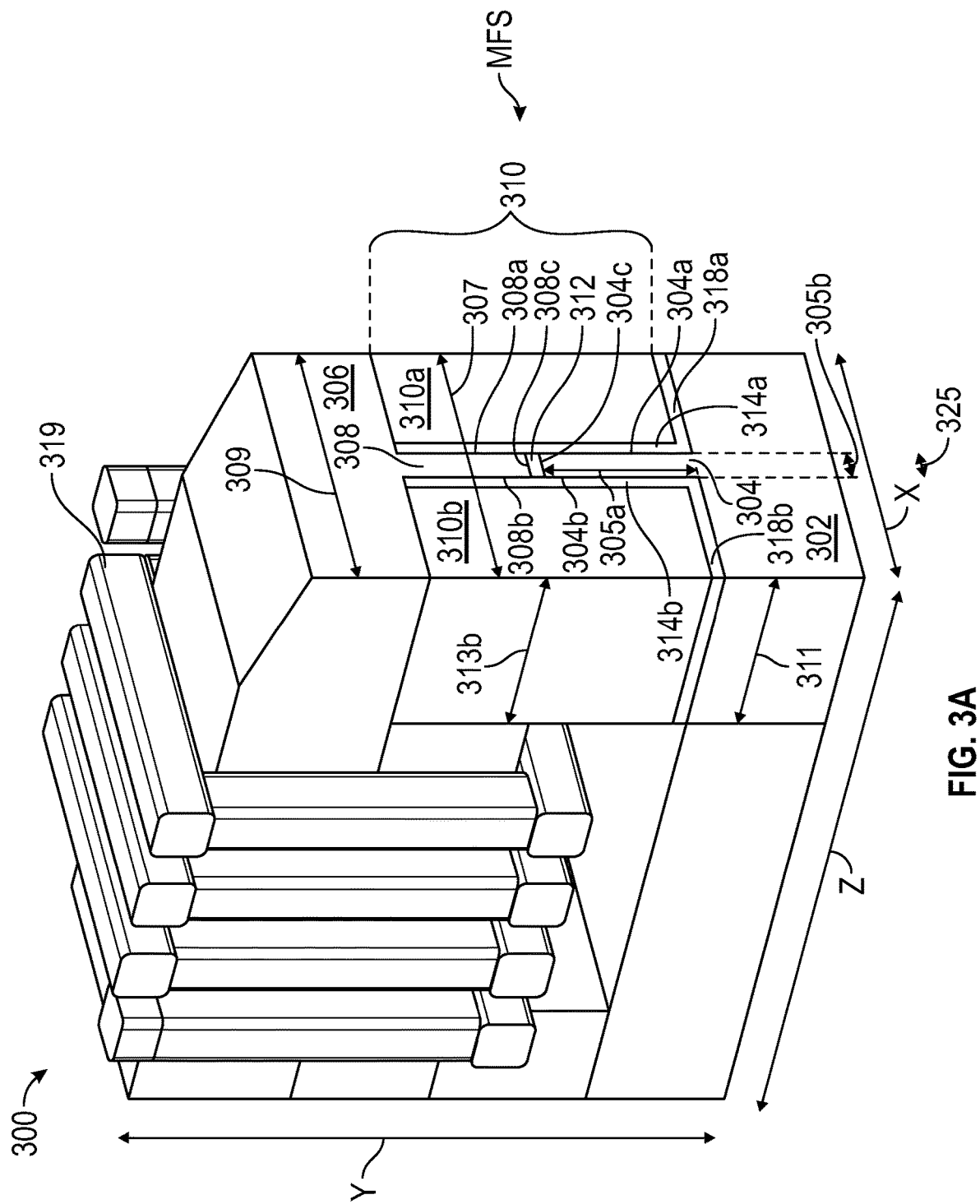
FIG. 3A illustrates a tape head, according to one embodiment.

FIG. 3A illustrates a side angled view of a tape head 300, according to one embodiment. The tape head 300 may be within a storage device, such as the tape drive 100 of FIG. 1A. The tape head 300 may be the tape head 200 of FIG. 2.

The tape head 300 comprises a trailing shield 306 and a leading shield 302 disposed at a media facing surface (MFS), and a first side shield 310a and a second side shield 310b disposed between the trailing shield 306 and the leading shield 302 in the y-direction. The first side shield 310a and the second side shield 310b may collectively be referred to as the side shields 310. The trailing shield 306 is disposed opposite the leading shield 302 in the y-direction. A first write pole 304 is coupled to the leading shield 302 and extends in the y-direction towards the trailing shield 306. A second write pole 308 is coupled to the trailing shield 306 and extends in the y-direction towards the leading shield 302. The leading shield has a first depth 311 of about 0.5 micro meter (μm) to about 100 μm or greater in the z-direction away from the MFS, wherein the first depth 311 of the leading shield 302 is approximately equal to or greater than a first height 305a of the first write pole 304. The first write pole 304 is disposed opposite the second write pole 308 in the y-direction.

The first side shield 310a is disposed adjacent to a first surface 304a of the first write pole 304, and a first surface 308a of the second write pole 308. The second side shield 310b is disposed adjacent to a second surface 304b of the first write pole 304, and a second surface 308b of the second write pole 308. The first surface 304a of the first write pole 304 is disposed opposite the second surface 304b of the second write pole 304 in the x-direction. Similarly, the first surface 308a of the second write pole 308 is disposed opposite the second surface 308b of the second write pole 308 in the x-direction. The side shields 310 are further disposed in contact with the trailing shield 306.

The first side shield 310a has a second depth 313a (not shown) of about 0.5 μm to about 100 μm or greater in the z-direction away from the MFS, wherein the second depth 313a of the first side shield 310a is approximately equal to or greater than a track width 325 of the first write pole 304, wherein the track width 325 is approximately equal to a width 305b of the third surface 304c of the first write pole 304. The second side shield 310b has a third depth 313b of about 0.5 μm to about 100 μm or greater in the z-direction away from the MFS, wherein the second depth 313a of the first side shield 310a is approximately equal to or greater than the track width 325 of the first write pole 304. The second depth 313a (not shown) of the first side shield 310a is substantially equal to the third depth 313b of the second side shield 310b. The second depth 313a of the first side shield 310a, and the third depth 313b of the second side shield 310b are substantially equal to a first depth 311 of the leading shield 302 (i.e. depth of the side shields 310 is the same depth as the leading shield 302). The side shields 310 are soft bias side shields comprising a material of selected from the group: nickel (Ni), Iron (Fe), NiFe alloy, NiFe alloy doped with chromium (Cr) or hafnium (Hf), and combinations thereof.

A first insulation layer 312 is disposed between and in contact with a third surface 304c of the first write pole 304 and a third surface 308c of the second write pole 308. The third surface 304c of the first write pole 304 is disposed opposite the third surface 308c of the second write pole 308 in the y-direction. The first insulation layer 312 has a thickness of about 2 nm to about 50 nm. The first insulation layer 312 comprises a material selected from the group: aluminum oxide (AlOx), magnesium oxide (MgO), silicon nitride (SiNx), silicon oxide (SiOx), tantalum (TaOx), aluminum nitride (AlN), hafnium oxide (hfO), silicon carbide (SiC) and combinations thereof. The first insulation layer 312 separates the first write pole 304 from the second write pole 308.

A second insulation layer 314 is disposed between the side shields 310, and the first write pole 304 and the second write pole 308. The second insulation layer 314 comprises a first portion 314a disposed between the first side shield 310a, and the first surface 304a of the first write pole 304 and the first surface 308a of the second write pole 308, and a second portion 314b disposed between the second side shield 310b, and the second surface 304b of the first write pole and the second surface 308b of the second write pole 308. The first portion 314a and the second portion 314b of the second insulation layer 314 each has a thickness of about 2 nm to about 50 nm in the x-direction. The side shields 310, the first write pole, and the second insulation layer have a first width 307 in the x-direction. The first width 307 is substantially equal to a second width 309 in the x-direction of the trailing shield 306 (i.e. the side shields 310, the first write pole 304, and the second insulation layer 314 together are the same width as the trailing shield 306). The second insulation layer 314 may comprise the same material as the first insulation layer 312. The second insulation layer 314 separates the side shields 310 from the first write pole 304 and the second write pole 308.

A third insulation layer 318 is disposed between the side shields 310 and the leading shield 302, and is coupled to the second insulation layer 314. The third insulation layer 318 comprises a first portion 318a disposed between the first side shield 310a and the leading shield 302 in the y-direction and coupled to the first portion 314a of the second insulation layer, and a second portion 318b disposed between the second side shield 310b and leading shield 302 in the y-direction and coupled to the second portion 314b of the second insulation layer. The first portion 318a and the second portion 318b of the third insulation layer 318 each has a thickness of about 2 nm to about 50 nm in the y-direction. The third insulation layer 318 may comprise the same material as the first insulation layer 312 and/or the second insulation layer 314. The third insulation layer 318 separates the side shields 310 from the leading shield 302.

The tape head 300 further comprises a coil 319, where the coil is configured to produce a magnetic field to enable the tape head 300 to write data to a media, such as a magnetic tape.

Figure 3B:
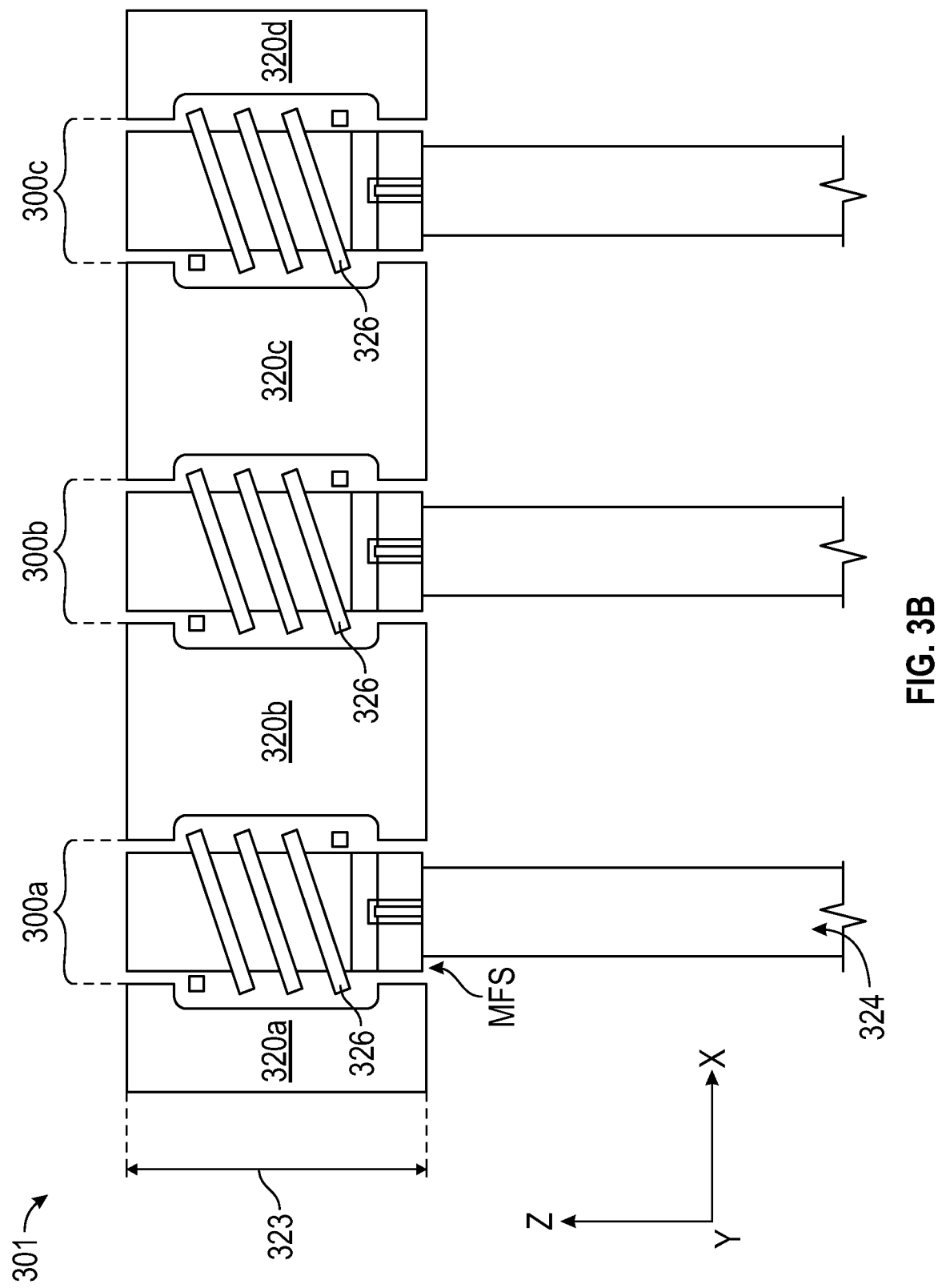
FIGS. 3B and 3C illustrate a top-down view of a tape head array, according to various embodiments.
Figure 3C:
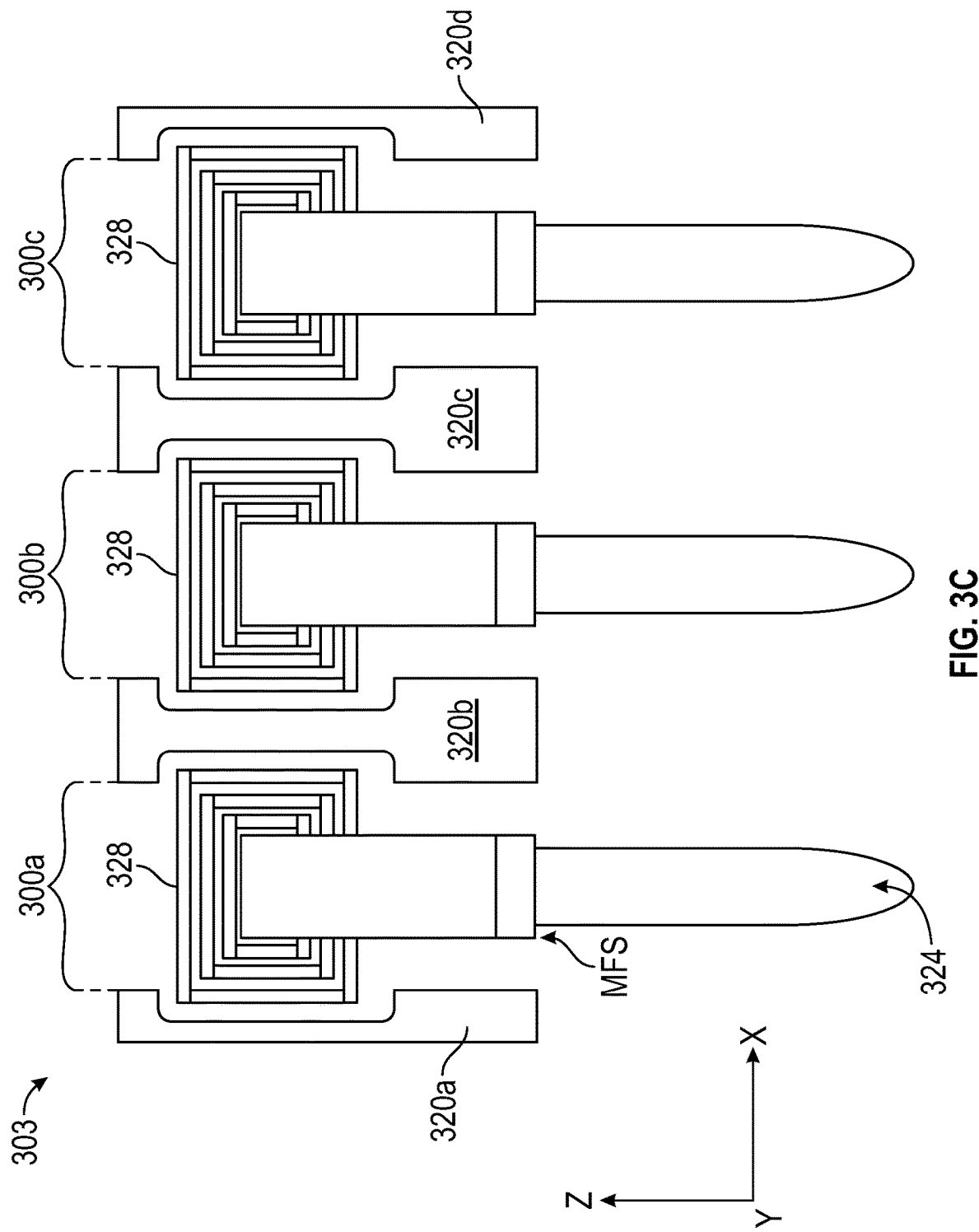

FIGS. 3B and 3C illustrate a top-down view of a tape head array, according to various embodiments. FIG. 3B illustrates a tape head array 301 comprising tape heads 300a-300c and blocking shields 320a-320d disposed between each of the tape heads 300a-300c. The tape heads 300a-300c may be the tape head 300 of FIG. 3A. The tape head array 301 may be within a storage device, such as the tape drive 100 of FIG. 1A. One or more of the tape heads of the tape head array 301 may be the tape head 200 of FIG. 2.

It is to be understood that tape heads 300a-300c are identical; therefore, for exemplary purposes only tape head 300a will be described in detail. It is to be further understood that the tape head array 301 may comprise any number of tape heads and is not limited to only three tape heads like shown.

Tape head 300a comprises a coil 326 in a helical configuration. The tape media 324 is passed along the MFS of the tape head 300a thereby permitting the tape head 300a to write data to the tape media 324. The tape media 324 may be the tape media 115 of FIG. 1B. The tape head 300a is disposed between a first blocking shield 320a and a second blocking shield 320b in the x-direction, the tape head 300b is disposed between the second blocking shield 320b and a third blocking shield 320c in the x-direction, and the tape head 300c is disposed between the third blocking shield 320c and a fourth blocking shield 320d in the x-direction.

The blocking shields 320a-320d each individually extends along the length 323 of the tape heads 300a-300c in the z-direction (i.e. the blocking shields 320a-320d are the same length as the tape heads 300a-300c). The first blocking shield 320a and the second blocking shield 320b do not contact the tape head 300a, the second blocking shield 320b and the third blocking shield 320c do not contact the tape head 300b, and the third blocking shield 320c and the fourth blocking shield 320d do not contact the tape head 300c. The first blocking shield 320a and the second blocking shield 320b isolate the tape head 300a from the tape head 300b, the second blocking shield 320b and the third blocking shield 320c isolate the tape head 300b from the tape heads 300a and 300c, and the third blocking shield 320c and the fourth blocking shield 320d isolate the tape head 300c from the tape head 300b, thereby reducing cross-talk between the tape heads 300a-300c when writing data to the tape media 324.

FIG. 3C illustrates a tape head array 303 comprising the tape head 300 of FIG. 3A. The tape head array 303 may be within a storage device, such as the tape drive 100 of FIG. 1A. One or more of the tape heads of the tape head array 303 may be the tape head 200 of FIG. 2.

The tape head array 303 is the same as the tape head array 301 of FIG. 3B; however, the coil 328 differs. In tape head array 303, the coil 328 is in a pancake configuration. While the blocking shields 320a-320d have a slightly different shape in the tape head array 303, the blocking shields 320a-320d function the same as in the tape head array 301 of FIG. 3B.

Figure 4A:
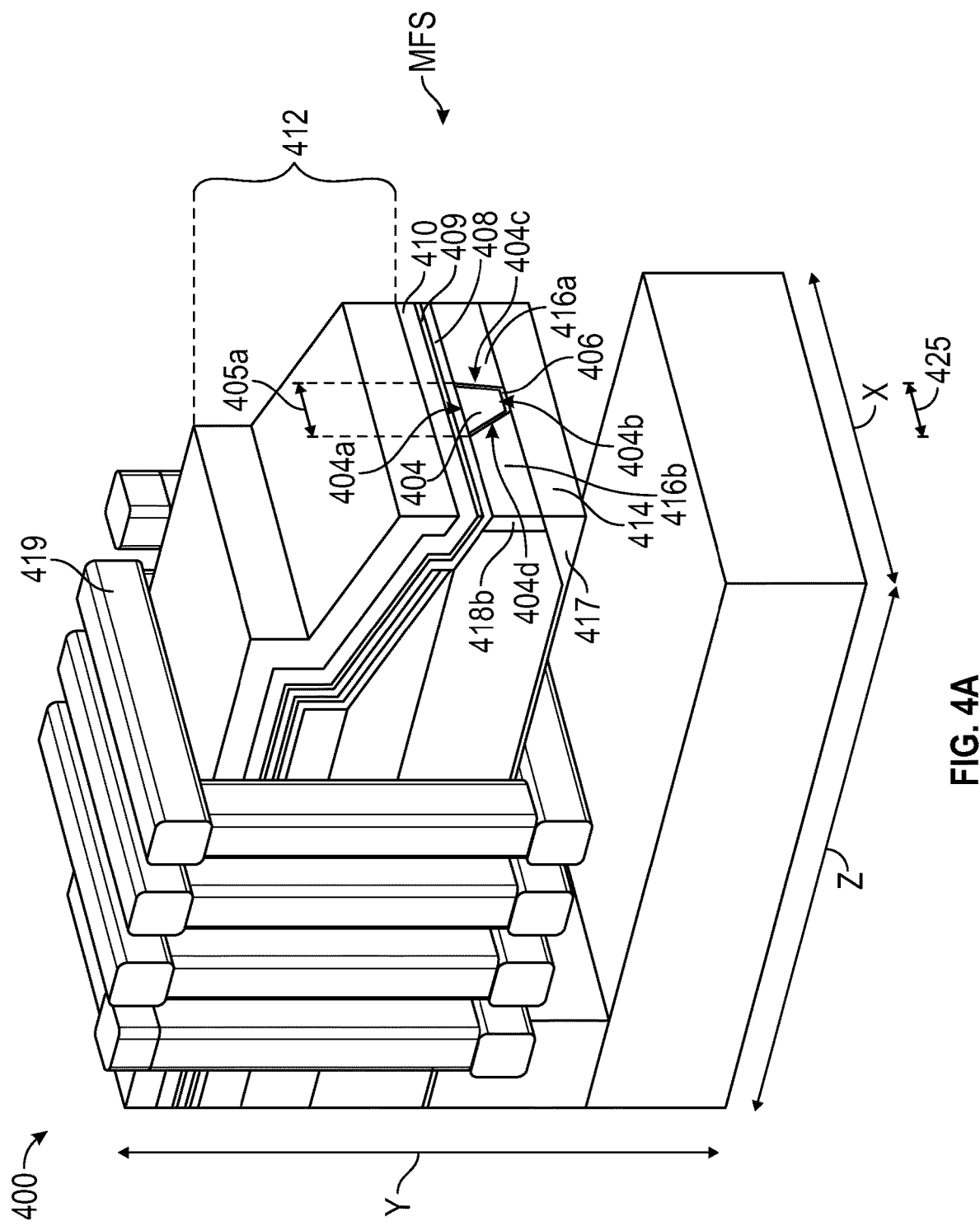
FIGS. 4A and 4B illustrate various views of a tape head array, according to one embodiment.
Figure 4B:
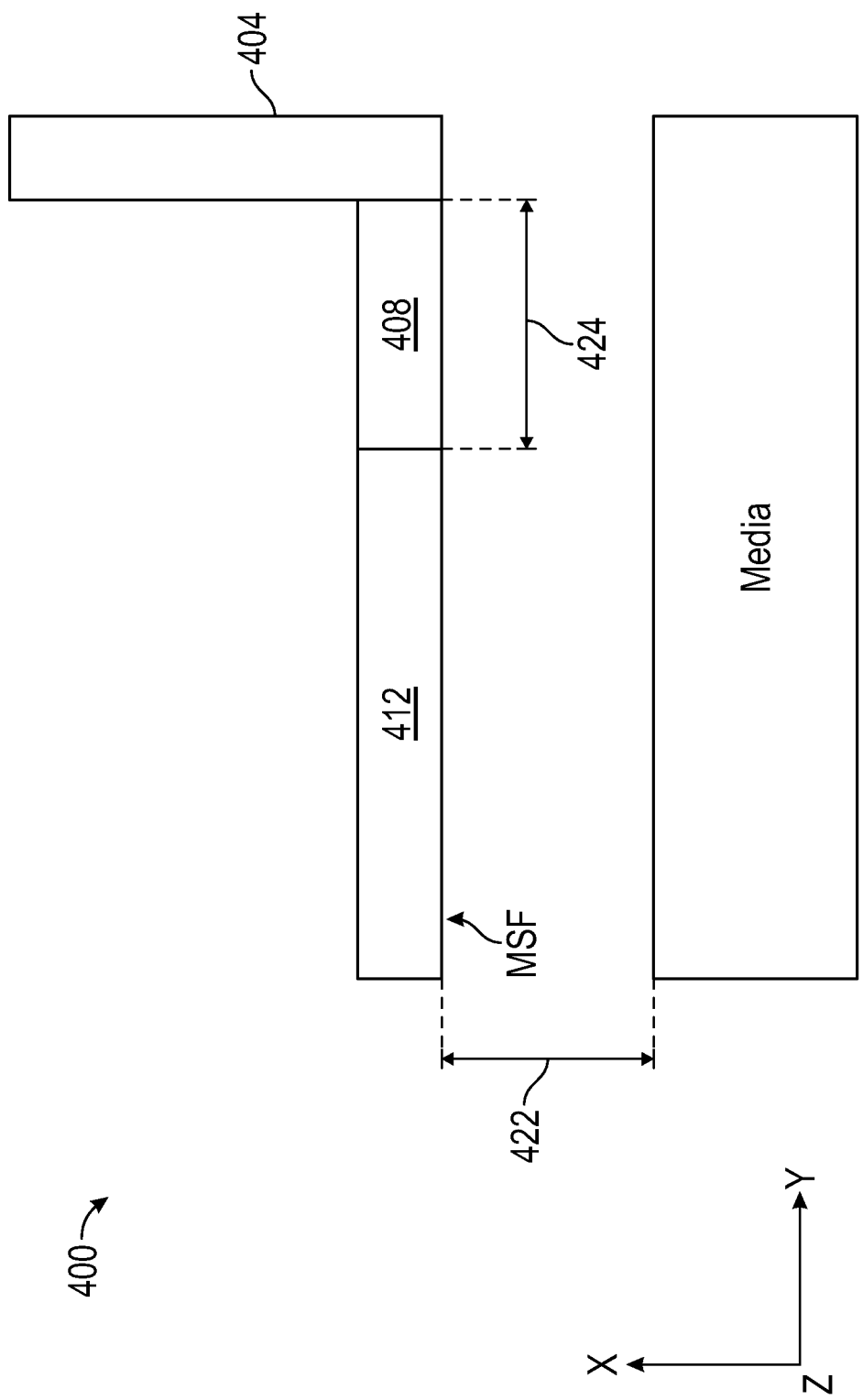

FIGS. 4A and 4B illustrate various views of a tape head, according to one embodiment. FIG. 4A illustrates a side angled view of a tape head 400, according to one embodiment. The tape head 400 may be within a storage device, such as the tape drive 100 of FIG. 1A. The tape head 400 may be the tape head 200 of FIG. 2.

The tape head 400 comprises a main pole 404 disposed between a trailing shield 412 and a leading shield 414 in the y-direction, and between a first side shield 416a and a second side shield 416b in the x-direction. The trailing shield 412 is disposed adjacent to a first surface 404a of the main pole 404 and comprises a hot seed layer 410. The leading shield 414 is disposed adjacent to a second surface 404b of the main pole 404. The leading shield has a first depth 417 in the z-direction away from the MFS. The first surface 404a of the main pole 404 is opposite the second surface 404b of the main pole 404 in the y-direction.

The first side shield 416a is disposed adjacent to a third surface 404c of the main pole 404. The second side shield 416b is disposed adjacent to a fourth surface 404d of the main pole 404. The third surface 404c of the main pole 404 is opposite the fourth surface 404d of the main pole 404 in the x-direction. The first side shield 416a and the second side shield 416b are further disposed between the trailing shield 412 and the leading shield 414 in the y-direction, wherein the first side shield 416a and the second side shield 416b are further disposed in contact with the leading shield. The first side shield 416a has a first depth 418a (not shown) of about 0.5 µm to about 100 µm or greater in the z-direction away from the MFS, wherein the first depth 418a is approximately equal to or greater than a track width 425 of the main pole 404, wherein the track width 425 is approximately equal to a width 405a of the first surface 404a of the main pole 404. The second side shield 416b has a third depth 418b of about 0.5 µm to about 100 µm or greater in the z-direction away from the MFS, wherein the third depth 418b is approximately equal to or greater than the track width 425 of the main pole 404. The first depth 418a (not shown) of the first side shield 416a is substantially equal to the third depth 418b of the second side shield 416b. The first depth 418a of the first side shield 416a, and the third depth 418b of the second side shield 416b are less than a first depth 417 of the leading shield 414 (i.e. the first side shield 416a and the second side shield 416b do not extend into the tape head 400 as far as the leading shield 414). The first side shield 416a and the second side shield 416b are each soft bias side shields comprising a material selected from the group: nickel (Ni), Iron (Fe), NiFe alloy, NiFe alloy doped with chromium (Cr) or hafnium (Hf), and combinations thereof.

A side gap 406 is disposed adjacent to the second surface 404b of the main pole 404, the third surface 404c of the main pole 404, and the fourth surface 404d of the main pole 404. The side gap 406 surrounds the main pole 404, separating the main pole 404 from the first side shield 416a and the second side shield 416b. The side gap 406 comprises a non-magnetic insulating material selected from the group: AlOx, MgOx, SiNx, TaOx, HfO, SiC, and combinations thereof. A trailing gap 408 is disposed between the first surface 404a of the main pole 404 and the trailing shield 412 in the y-direction. The trailing gap comprises a magnetic seed layer 409 insulating material that may be the same as the trailing shield 412. The trailing gap 408 separates the main pole 404 from the trailing shield 412.

The tape head 400 further comprises a coil 419, where the coil is configured to produce a magnetic field to enable the tape head 400 to write data to a media, such as a magnetic tape. The coil 419 may the same as the coil 326 of FIG. 3B or the coil 328 of FIG. 3C.

FIG. 4B is a schematic cross section view of the tape head 400 of FIG. 4A at a MFS. The trailing gap 408 has a thickness 424 of about 0.5 µm to about 100 µm or greater in the y-direction, wherein the trailing gap thickness 424 of the trailing gap 408 is approximately equal to half the track width of the main pole 404 or greater (See FIG. 4A). The trailing shield 412, the trailing gap 408, and the main pole 404 are recessed a first distance 422 from the MFS. The effectiveness of the first side shield 416a, the second side shield 416b, and the trailing shield 412 is optimal when the trailing gap thickness 424 is equal to the first distance 422.

Figure 5:
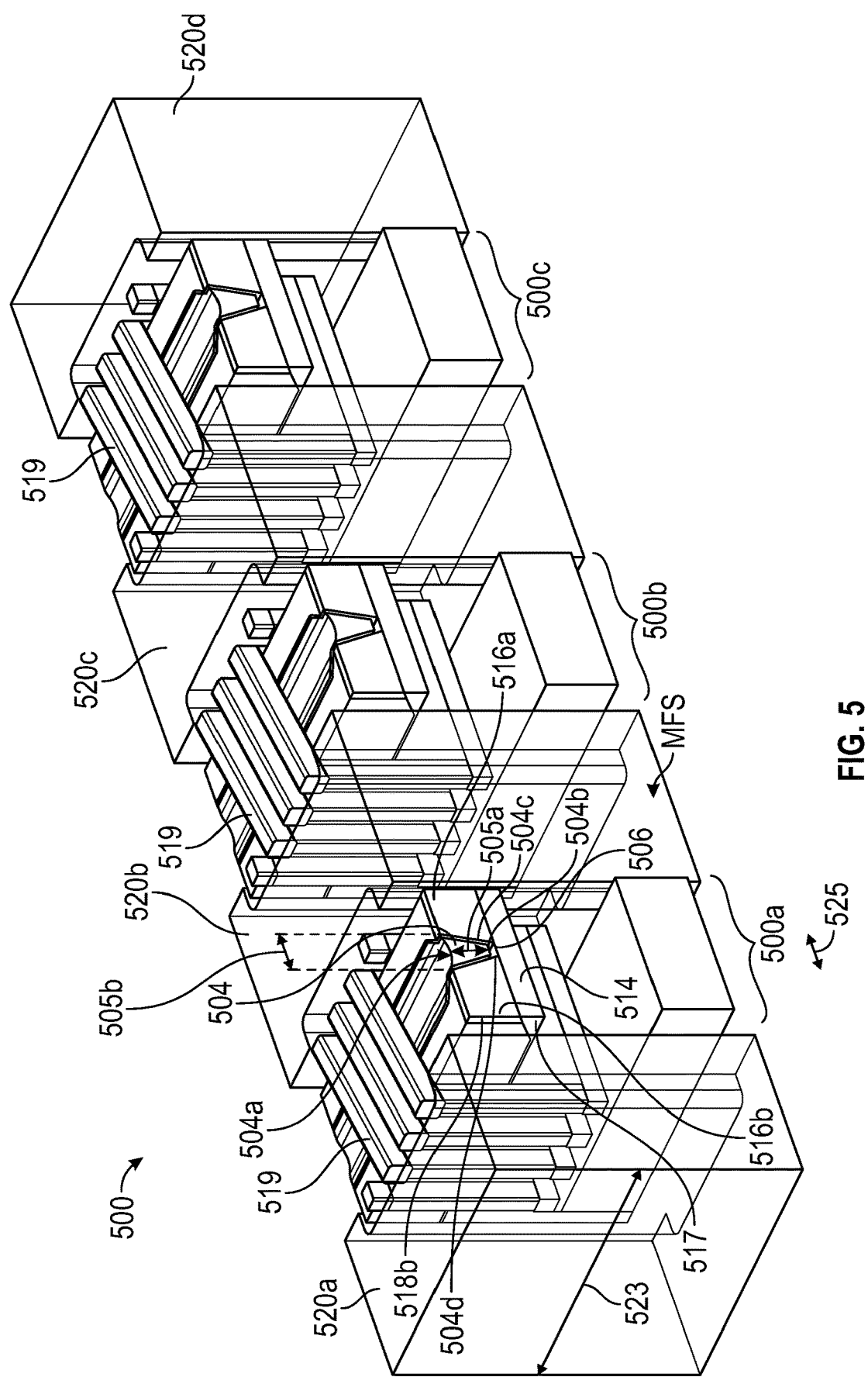
FIG. 5 illustrates a side angled view of a tape head array, according to one embodiment.

FIG. 5 illustrates a side angled view of a tape head array 500, according to one embodiment. In some embodiments, the tape head array 500 may comprise the tape head 400 of FIGS. 4A and 4B. The tape head array 500 may be within a storage device, such as the tape drive 100 of FIG. 1A. One or more of the tape heads of the tape head array 500 may be the tape head 200 of FIG. 2.

The tape head array 500 comprises tape heads 500a-500c and blocking shields 520a-520d disposed between the tape heads 500a-500c. It is to be understood that tape heads 500a-500c are identical; therefore for exemplary purposes only tape head 500a will be described in detail. It is to be further understood that the tape head array 500 may comprise any number of tape heads.

Tape head 500a comprises a coil 519 in a helical configuration. Tape media (not shown) is passed along the MFS of the tape head 500a thereby permitting the tape head 500a to write data to the tape media. The tape media may be the tape media 115 of FIG. 1B. The tape head 300a is disposed between a first blocking shield 520a and a second blocking shield 520b in the x-direction, the tape head 500b is disposed between the second blocking shield 520b and a third blocking shield 520c in the x-direction, and the tape head 500c is disposed between the third blocking shield 520c and a fourth blocking shield 520d in the x-direction.

The blocking shields 520a-520d each individually extends along the length 523 of the tape heads 500a-500c in the z-direction (i.e. the blocking shields 520a-520d are the same length as the tape heads 500a-500c). The first blocking shield 520a and the second blocking shield 520b do not contact the tape head 500a, the second blocking shield 520b and the third blocking shield 520c do not contact the tape head 500b, and the third blocking shield 520c and the fourth blocking shield 520d do not contact the tape head 500c. The first blocking shield 520a and the second blocking shield 520b isolate the tape head 500a from the tape head 500b, the second blocking shield 520b and the third blocking shield 520c isolate the tape head 500b from the tape heads 500a and 500c, and the third blocking shield 520c and the fourth blocking shield 520d isolate the tape head 500c from the tape head 500b, thereby reducing cross-talk between the tape heads 500a-500c when writing data to the tape media.

The tape head 500a is similar to the tape head 400 of FIGS. 4A and 4B; however, the tape head 500a does not comprise a trailing shield. The tape head 500a comprises a main pole 504 disposed above a leading shield 514 in the y-direction, and between a first side shield 516a and a second side shield 516b in the x-direction. A first surface 504a of the main pole 504 is concaved (e.g., curved or semi-circularly or inwards towards the leading shield 514) and exposed to a coil 519. The coil 519 is configured to produce a magnetic field to enable the tape head 500a to write data to a media, such as a magnetic tape. The coil 519 may the same as the coil 326 of FIG. 3B or the coil 328 of FIG. 3C. The leading shield 514 is disposed adjacent to a second surface 504b of the main pole 504. The leading shield 514 has a first depth 517 of about 0.5 µm nm to about 100 µm or greater in the z-direction away from the MFS, wherein the first depth 517 of the leading shield 514 is approximately equal to or greater than a first height 505a of the main pole 504. The first surface 504a of the main pole 504 is opposite the second surface 504b of the main pole 504 in the y-direction.

The first side shield 516a is disposed adjacent to a third surface 504c of the main pole 504. The second side shield 516b is disposed adjacent to a fourth surface 504d of the main pole 504. The third surface 504c of the main pole 504 is opposite the fourth surface 504d of the main pole 504 in the x-direction. The first side shield 516a and the second side shield 516b are further disposed above and in contact with the leading shield 514 in the y-direction. The first side shield 516a has a second depth 518a (not shown) of about 0.5 µm to about 100 µm or greater in the z-direction away from the MFS, wherein the second depth 518a is approximately equal to or greater than a track width 525 of the main pole 504, wherein the track width 525 is approximately equal to a width 505b of the first surface 504a of the main pole 504. The second side shield 516b has a third depth 518b of about 0.5 µm to 100 µm or greater in the z-direction away from the MFS, wherein the third depth 518b is approximately equal to or greater than the track width 525 of the main pole 504. The second depth 518a (not shown) of the first side shield 516a is substantially equal to the third depth 518b of the second side shield 516b. The second depth 518a of the first side shield 516a, and the third depth 518b of the second side shield 516b are less than the first depth 517 of the leading shield 514 (i.e. the first side shield 516a and the second side shield 516b do not extend into the tape head 500a as far as the leading shield 514).

FIGS. 6A-6H illustrate a process flow of a method 600 of forming a tape head, according to one embodiment. The method 600 can be used, for example, to form the tape head 300 of FIG. 3A. As such, aspects of FIG. 3A may be referenced in FIGS. 6A-6H. The method 600 may comprise additional operations that are not shown or described with respect to FIGS. 6A-6H, such as forming blocking shields. It is to be understood that although FIGS. 6A-6H illustrate a method 600 of forming one tape head, the method 600 may alternatively be used to form one or more tape heads or an array of tape heads.

FIG. 6A illustrates forming a first leading shield base structure 602 which will be used to form the leading shield 302 and the first write pole 304.

FIG. 6B illustrates depositing the first insulation layer 312 on and in contact with the first leading shield base structure 602, and depositing a plate seed layer 604 on and in contact with the first insulation layer 312. Both the first insulation layer 312 and the plate seed layer 604 have a same general shape as the first leading shield base structure 602.

FIG. 6C illustrates forming a photoresist layer 606 on and in contact with the plate seed layer 604. A portion of the photoresist layer 606 at the MFS is removed in FIG. 6C, as shown by the patterned or etched out area 608, to form the second write pole 308. Thus, the etched out area 608 has a same shape as the second write pole 308.

FIG. 6D illustrates forming a second write pole 308 by plating the etched out area 608 that was removed in FIG. 6C.

FIG. 6E illustrates removing (i.e., lifting off or milling) the photoresist layer 606. Upon removing the photoresist layer 606, the second write pole 308 is used as a mask for removing a portion of the first insulation layer 312, the plate seed layer 604, and a portion of the first leading shield base structure 602. The remaining portion of the first insulation layer 312 and the plate seed layer 604 is disposed on and in contact with the second write pole 308, while the rest of the first insulation layer 312 and plate seed layer 604 are removed entirely. The first portion of the first leading shield base structure 602 that remains forms the first write pole 304 (i.e., the portion of the first leading shield base structure 602 disposed in contact with the remaining first insulation layer 312 and plate seed layer 604). A second portion of the first leading shield base structure 602 that remains is forms the leading shield 302.

FIG. 6F illustrates depositing a second insulation layer 314 around the first write pole 304 and the second write pole 308, and forming a third insulation layer 318 on top of the leading shield 302.

FIG. 6G illustrates forming side shields 310 on top of the second insulation layer 314 and the third insulation layer 318. The side shields 310 are spaced from both the first write pole 304 and the second write pole 308 by the second insulation layer 314.

FIG. 6H illustrates planarizing at least a portion of the side shields 310, such as by chemical mechanical polishing (CPM), so that the side shields 310 do not extend above the second write pole 308. In other words, a top portion of the side shields 310 are planarized or smoothed such that the side shields 310 are aligned with a surface of the second write pole 308. Upon planarizing the side shields 310, the trailing shield (not shown) may be formed.

It is to be understood that method 600 may not show every step in the fabrication of a tape head. Although some steps may not be shown, it is not to be considered limiting. For instance, following FIG. 6H, a trailing shield, such as the trailing shield 306 of the tape head 300 of FIG. 3A, may be formed on top of the side shields 310 of FIG. 6H.

Figure 7Q:
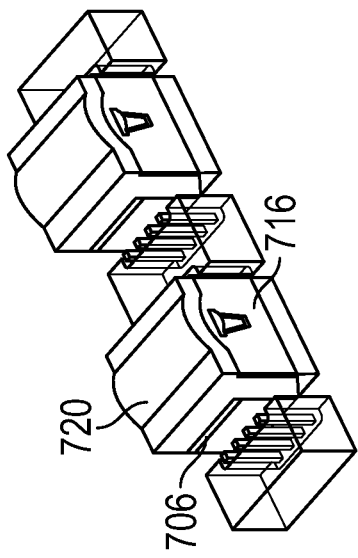
FIGS. 7A-7T illustrate a process flow of a method of forming a tape head, according to another embodiment.
Figure 7R:
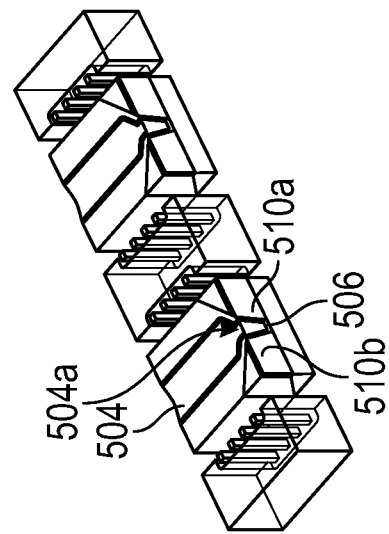
Figure 7S:
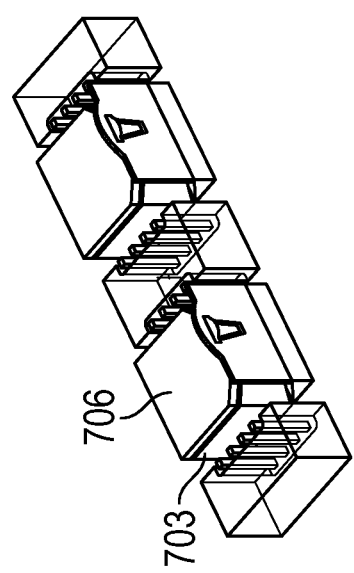
Figure 7T:
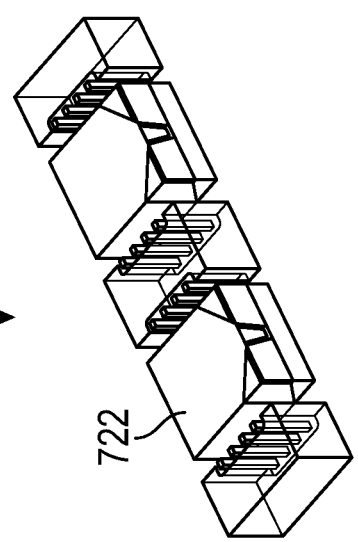

FIGS. 7A-7T illustrate a process flow of a method 700 of forming a tape head, according to one embodiment. The method 700 can be used, for example, to form the tape head 502a of FIG. 5 or the tape head 400 of FIG. 4A. As such, aspects of FIG. 5A may be referenced in FIGS. 7A-7T. The method 700 may comprise additional operations that are not shown or described with respect to FIGS. 7A-7T, such as forming blocking shields. It is to be understood that although FIGS. 7A-7T illustrate a method 700 of forming two tape heads simultaneously, the method 700 may alternatively be used to form a single tape head or an array of tape heads.

FIG. 7A illustrates forming a hard mask 702 on top of a fill layer 703. The fill layer 703 is disposed on and in contact with a leading shield 514.

FIG. 7B illustrates removing a portion of the fill layer 703 that is not covered by the hard mask 702, creating a first portion 703a of the fill layer 703 and a second portion 703b of the fill layer 703. The fill layer 703 may be removed through a trench reactive-ion etching process. A portion of the leading shield 514 is exposed between the first portion 703a of the fill layer 703 and the second portion 703b of the fill layer 703.

FIG. 7C illustrates depositing a first portion 704a of a seed layer over the first portion 703a of the fill layer 703, depositing a second portion 704b of the seed layer over of the second portion 703b of the fill layer 703, and depositing a third portion 704c of the seed layer over the exposed portion of the leading shield 514.

FIG. 7D illustrates plating a main pole 504 on top of the first portion 704a of the seed layer, the second portion 704b of the seed layer, and the third portion 704c of the seed layer. One or more of the first, second, and third portions 704a-704c of the seed layer form the side gap 506.

FIG. 7E illustrates removing or planarizing a portion of the main pole 504 through CMP. The CMP process removes the a portion of the main pole 504, and the first portion 704a and the second portion 704b of the seed layer from above the first portion 703a of the fill layer 703 and the second portion 703b of the fill layer 703, resulting in a first surface 504a of the main pole 504 being flush with the height of the first portion 703a of the fill layer 703 and the second portion 703b of the fill layer 703. The part of the first portion 704a of the seed layer deposited in FIG. 7C that has not been removed serves as an insulation layer (e.g., side gap) to separate the main pole from the first portion 703a of the fill layer 703. The part of the second portion 704b of the seed layer deposited in FIG. 7C that has not been removed serves as an insulation layer (e.g., side gap) to separate the main pole from the second portion 703b of the fill layer 703. The third portion 704c of the seed layer disposed between the main pole 504 and the leading shield 514 serves as an insulation layer (e.g., side gap or leading gap) between the main pole 504 and the leading shield 514.

FIG. 7F illustrates removing a portion of the first surface 504a of the main pole 504 through CMP, so that the first surface 504a of the main pole 504 is concaved or curved or semi-circularly or inwards towards the leading shield 514. As such, the first surface 504a of the main pole 504 is no longer flush or aligned with the first portion 703a and the second portion 703b of the fill layer 703.

In some embodiments, the process illustrated in FIG. 7F is not performed such as in the process of form the tape head 400 of FIG. 4A, where the first surface 504a of the main pole 504 is not concaved or curved or semi-circularly or inwards towards the leading shield 514.

FIG. 7G illustrates depositing a hard mask 706 and a CMP stop layer 722 over the first portion 703a of the fill layer 703, the second portion 703b of the fill layer 703, and the first surface 504a of the main pole 504. A portion of the main pole 504 at the MFS remains exposed.

FIG. 7H illustrates depositing a photoresist layer 710 on and in contact with the hard mask 706, and removing a first portion 710a and a second portion 710b of the photoresist layer 710 to expose portions 706a and 706b of the hard mask 706. The photoresist layer 710 remains disposed over the main pole 504, and the exposed portions of the hard mask 706 are disposed over the fill layer 703.

FIG. 7I illustrates removing (i.e., milling) the exposed portions 706a and 706b of the hard mask 706 of FIG. 7H, and exposing a surface of the first portion 703a and a surface of the second portion 703b of the fill layer 703.

FIG. 7J illustrates lifting off or removing the photoresist layer 710 of FIG. 7I to expose the hard mask 706.

FIG. 7K illustrates removing sections of the first portion 703a and the second portion 703b of the fill layer 703 that were not covered by hard mask 706 from FIGS. 7H-7J. Sections of the fill layer 703 are removed at the MFS such that the fill layer 703 has a pentagon-like shape.

FIG. 7L illustrates depositing a photoresist layer 712 over the hard mask 706, where the photoresist layer 712 also covers sections of the first portion 703a and the second portion 703b of the fill layer 703.

FIG. 7M illustrates etching away sections of the first portion 703a and the second portion 703b of the fill layer 703 not covered by the photoresist layer 712, where the section of the fill layer 703 removed are disposed adjacent to the leading shield 514.

FIG. 7N illustrates lifting off or removing the photoresist layer 712 of FIG. 7M, thereby exposing the hard mask 706 and remaining portions of the first portion 703a and the second portion 703b of the fill layer 703.

FIG. 7O illustrates depositing a photoresist layer 714 over the hard mask 706 and the fill layer 703 exposed in FIG. 7N.

FIG. 7P illustrates depositing side shield plating 716 at the MFS adjacent to the exposed portion of the main pole 504. In other words, the side shield plating 716 is deposited on the surface of the photoresist layer 714 adjacent to the MFS. The side shield plating 716 is disposed in contact with the leading shield 514 and the side gap 506, and will be used to form the side shields 510 (not shown) in subsequent steps. The side shields 510 have a first depth 517 from the MFS into the tape head of about 0.5 μm to about 100 μm or greater, wherein the first depth 517 of the side shields 510 is approximately equal to or greater than a track width 525 of the main pole 504, wherein the track width 525 is approximately equal to a width 505b of the first surface 504a of the main pole 504.

FIG. 7Q illustrates lifting off or removing the photoresist layer 714 of FIGS. 7O and 7P, thereby exposing the hard mask 706 and the fill layer 703.

FIG. 7R illustrates depositing a refill layer 720 over the hard mask 706 and in the removed portions 703a and 703b of the fill layer 703, where a portion of the refill layer 720 is behind and in contact with the side shield plating 716.

FIG. 7S illustrates removing a portion of the refill layer 720 and all of the hard mask 706 of FIG. 7R through a CMP process, thereby exposing the CMP stop layer 722.

FIG. 7T illustrates removing the CMP stop layer 722 through a reactive-ion etching (RIE) process to expose the first surface 504a of the main pole 504. Upon removing the layer 722, the coil 519 (not shown) may be formed to complete the tape head, which comprises a main pole 504 having a curved or concaved first surface 504a and side shields 510 having a thickness of about 2 nm to about 50 nm spaced from the main pole 504 by the side gap 506.

By closely positioning a soft bias side shield adjacent to write poles and/or a main pole (i.e., spaced from the write pole and/or main pole by a thin insulation layer or thin side gap), and between a trailing shield and a leading shield, cross-talk between tape heads is reduced resulting in improved writing by the tape head.

In one embodiment, a tape head comprises a trailing shield disposed at a media facing surface (MFS), a first write pole coupled to the trailing shield, a leading shield disposed at the MFS adjacent to the first write pole, a second write pole coupled to the leading shield, wherein the second write pole is disposed adjacent to the first write pole, a side shield disposed adjacent to the first write pole and the second write pole, wherein the side shield is a soft bias side shield, wherein the side shield is further disposed between the trailing shield and the leading shield, a first insulation layer disposed between the first write pole and the second write pole; a second insulation layer disposed between and in contact with the side shield and the first and second write poles, and a third insulation layer disposed between the side shield and the leading shield.

The side shield contacts the trailing shield. The side shield comprises a first side shield disposed adjacent to a first surface of the first write pole and a first surface of the second write pole, and a second side shield disposed adjacent to a second surface of the first write pole and a second surface of the second write pole. The first side shield, the second side shield, the first write pole, and the second insulation layer collectively have a first width about equal to a second width of the trailing shield. The leading shield has a first depth, and wherein the side shield has a second depth that is substantially equal to the first depth of the leading shield. The first insulation layer has a thickness of about 2 nm to about 50 nm. The second insulation layer has a thickness of about 2 nm to about 50 nm. The third insulation layer has a thickness of about 2 nm to about 50 nm. A tape drive comprising the tape head.

In another embodiment, a tape head comprises a plurality of read heads configured to read data to a tape, and a plurality of write heads configured to write data to the tape, wherein each of the plurality of write heads comprises: a main pole disposed at a media facing surface (MFS), a trailing shield disposed adjacent to a first surface of the main pole at the MFS, a leading shield disposed adjacent to a second surface of the main pole at the MFS, a first side shield disposed adjacent to a third surface of the main pole, the first side shield being spaced a distance of about 2 nm to about 50 nm from the third surface of the main pole, and a second side shield disposed adjacent to a fourth surface of the main pole, the second side shield being spaced a distance of about 2 nm to about 50 nm from the fourth surface of the main pole, wherein the first side shield and the second side shield are further disposed in contact with the leading shield.

The tape, wherein the first side shield has a first depth of about 0.5 µm to about 100 µm, wherein the first depth is approximately equal to or greater than a track width of the main pole, and the second side shield has a second depth of about 0.5 µm to about 100 µm, wherein the second depth is approximately equal to or greater than the track width of the main pole. The tape head, wherein the leading shield has a third depth greater than the first depth of the first side shield. The first side shield and the second side shield each comprises a material selected from the group consisting of: Ni, Fe, NiFe alloy, NiFe alloy doped with Cr, or Hf, and combinations thereof. The tape head, further comprising a first insulation layer disposed between the first surface of the main pole and the trailing shield, wherein the first insulation layer has a thickness of about 2 nm to about 50 nm. The tape head, further comprising a second insulation layer disposed between the second surface of the main pole and the leading shield, the third surface of the main pole and the first side shield, and the fourth surface of the main pole and the second side shield. A tape drive comprising the tape head.

In yet another embodiment, a tape head comprises a plurality of read heads configured to read data to a tape, and a plurality of write heads configured to write data to the tape, wherein each of the plurality of write head comprises: a main pole disposed at a media facing surface (MFS), wherein a first surface of the main pole is concaved, a leading shield disposed adjacent to a second surface of the main pole, wherein the leading shield has a first depth, a first side shield disposed adjacent to a third surface of the main pole, the first side shield being further disposed above and in contact with the leading shield at the MFS, wherein the first side shield has a second depth less than the first depth of the leading shield, a second side shield disposed adjacent to a fourth surface of the main pole, the second side shield being further disposed above an in contact with the leading shield at the MFS, wherein the second side shield has a third depth less than the first depth of the leading shield, and a coil.

The first surface of the main pole is further disposed adjacent to the coil. The coil is in a helical configuration. A tape drive comprising the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   a plurality of read heads configured to read data from a tape; and
   a plurality of write heads configured to write data to the tape, wherein each of the plurality of write heads comprises:
   a main pole disposed at a media facing surface (MFS);
   a trailing shield disposed adjacent to a first surface of the main pole at the MFS;
   a leading shield disposed adjacent to a second surface of the main pole at the MFS;
   a first side shield disposed adjacent to a third surface of the main pole, the first side shield being spaced a distance of about 2 nm to about 50 nm from the third surface of the main pole, wherein the first side shield has a first depth of 0.5 µm to 100 µm; and
   a second side shield disposed adjacent to a fourth surface of the main pole, the second side shield being spaced a distance of about 2 nm to about 50 nm from the fourth surface of the main pole, wherein:
   the first side shield and the second side shield are further disposed in contact with the leading shield,
   the first depth is approximately equal to or greater than a track width of the main pole,
   the second side shield has a second depth of 0.5 µm to 100 µm, the second depth being approximately equal to or greater than the track width of the main pole, and
   the leading shield has a third depth greater than the first depth of the first side shield.

2. The tape head of claim 1, wherein the first side shield and the second side shield each comprises a material selected from the group consisting of: Ni, Fe, NiFe alloy, NiFe alloy doped with Cr, or Hf, and combinations thereof.

3. The tape head of claim 1, further comprising a first insulation layer disposed between the first surface of the main pole and the trailing shield, wherein the first insulation layer has a thickness of about 2 nm to about 50 nm.

4. The tape head of claim 1, further comprising a second insulation layer disposed between the second surface of the main pole and the leading shield, the third surface of the main pole and the first side shield, and the fourth surface of the main pole and the second side shield.

5. A tape drive comprising the tape head of claim 1.

6. A tape head, comprising:
a plurality of read heads configured to read data from a tape; and
a plurality of write heads configured to write data to the tape, wherein each of the plurality of write heads comprises:
   a main pole disposed at a media facing surface (MFS);
   a trailing shield disposed adjacent to a first surface of the main pole at the MFS;
   a leading shield disposed adjacent to a second surface of the main pole at the MFS, the leading shield having a first depth;
   a first side shield disposed adjacent to a third surface of the main pole, the first side shield having a second depth less than the first depth; and
   a second side shield disposed adjacent to a fourth surface of the main pole, the second side shield having a third depth substantially equal to the second depth, wherein the second depth and the third depth are each individually approximately equal to or greater than a track width of the main pole, and wherein the second depth and the third depth are each individually 0.5 µm to 100 µm.

7. The tape head of claim 6, further comprising a trailing gap disposed between the first surface of the main pole and the trailing shield, wherein the trailing gap has a thickness that is about equal to half a track width of the main pole.

8. The tape head of claim 7, wherein the tape head is spaced a distance from the tape substantially equal to the thickness of the trailing gap.

9. The tape head of claim 7, wherein the first side shield and the second side shield are disposed in contact with the leading shield and the trailing gap.

10. The tape head of claim 6, wherein the first side shield and the second side shield each individually comprise Ni, Fe, a NiFe alloy, a NiFe alloy doped with Cr or Hf, or combinations thereof.

11. The tape head of claim 6, wherein the first side shield and the second side shield are each individually spaced a distance of about 2 nm to about 50 nm from the main pole.

12. A tape drive comprising the tape head of claim 6.

13. A tape head, comprising:
a plurality of read heads configured to read data from a tape; and
a plurality of write heads configured to write data to the tape, wherein each of the plurality of write heads comprises:
   a main pole disposed at a media facing surface (MFS);
   a trailing shield disposed adjacent to a first surface of the main pole at the MFS;
   a leading shield disposed adjacent to a second surface of the main pole at the MFS, the leading shield having a first depth;
   a first side shield disposed adjacent to a third surface of the main pole, the first side shield having a second depth less than the first depth;
   a second side shield disposed adjacent to a fourth surface of the main pole, the second side shield having a third depth, wherein the second depth and the third depth are each individually 0.5 µm to 100 µm, and the second depth and the third depth are each individually approximately equal to or greater than a track width of the main pole; and
   a side gap surrounding the second, third, and fourth surfaces of the main pole.

14. The tape head of claim 13, wherein the first side shield and the second side shield are disposed in contact with the leading shield.

15. The tape head of claim 13, wherein the first side shield and the second side shield are spaced from the trailing shield by a trailing gap, wherein the trailing gap has a thickness that is about equal to half a track width of the main pole.

16. The tape head of claim 13, wherein the first side shield and the second side shield each individually comprise a soft bias material.

17. The tape head of claim 13, wherein the side gap has a width of about 2 nm to about 50 nm.

18. A tape drive comprising the tape head of claim 13.

* * * * *